May 12, 1931.                J. F. MacINDOE                1,805,290
                    AUTOMATIC CONTROL FOR LUBRICATORS
                           Filed July 28, 1928
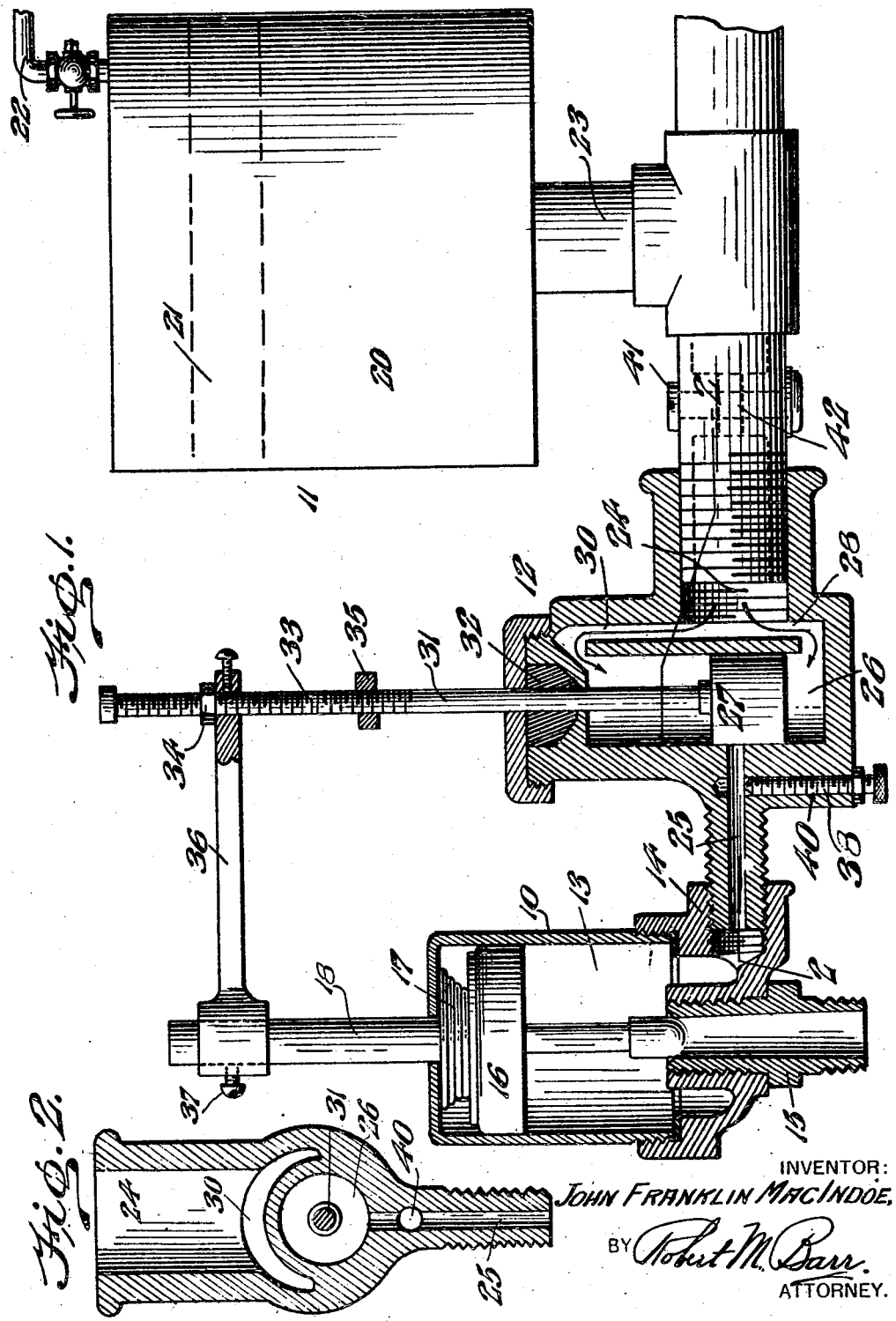
INVENTOR:
JOHN FRANKLIN MacINDOE,
BY Robert M. Barr.
ATTORNEY.

Patented May 12, 1931

1,805,290

UNITED STATES PATENT OFFICE

JOHN FRANKLIN MacINDOE, OF PHILADELPHIA, PENNSYLVANIA

AUTOMATIC CONTROL FOR LUBRICATORS

Application filed July 28, 1928. Serial No. 295,982.

The present invention relates to lubricating systems and more particularly to a device for automatically refilling lubricators, grease cups, and reservoir types of pressure attachments for bearings.

Some of the objects of the present invention are to provide means for automatically replenishing a lubricator when it is emptied; to provide a high pressure filling system for lubricators which fuctions to automatically recharge the lubricator and also functions to automatically cut off the high pressure supply when the lubricator has been refilled; to provide a main supply of lubricant which becomes automatically available in case the ordinary lubricators supplying grease to a bearing become overheated and discharge their contents at an abnormal rate; to provide an automatic refilling system for lubricators which is arranged to function at any desired level of lubricant within the grease supplying cup or lubricator; to provide a main grease supply system in conjunction with a lubricator or lubricators for maintaining a constant feed of lubricant to bearings wherein a control mechanism can be arranged to intermittently and automatically supply lubricant from the main system to the individual lubricator or lubricators or can be operated in direct connection therewith for continuous feed purposes; to provide a self-regulating system, and to provide other improvements as will hereinafter appear.

In the accompanying drawings, Fig. 1 represents a sectional elevation of a control device embodying one form of the present invention as applied to a pressure lubricating system; and Fig. 2 represents a section on line 2—2 of Fig. 1.

Referring to the drawings, a lubricating system is shown embodying one form of the present invention and generally consisting of a lubricator 10, a main lubricant supply 11 and a control mechanism 12 so arranged and associated with the parts as to carry out the function of the present invention. In the arrangement as shown in the drawings, the supply 11 is arranged to feed lubricant or grease under pressure to the lubricator 10 but it is to be understood that in general use there will probably be a plurality of such lubricators 10 arranged to be replenished from the supply 11; that is to say where there are a number of bearings to be lubricated each bearing will have a lubricator 10 attached thereto and arranged to supply the desired quantity of lubricant to maintain the bearing in efficient operating condition, but as such multiple units are merely a duplicate of the one here shown it is believed unnecessary to illustrate but one of the lubricators for purposes of this explanation.

In the present instance the lubricator 10 is of the continuous feed type consisting of a chamber 13 which serves as a reservoir for the supply of lubricant and which latter is introduced therein by way of an inlet fitting 14 while discharge takes place by way of a shank 15 which connects the lubricator to the bearing. The lubricant is discharged from the chamber 13 by a plunger 16 operated by a spring 17 compressed between the end of the lubricator and the plunger 16 and the position of the plunger 16 is indicated by the provision of a stem 18 attached to the plunger 16 and projecting through the end of the lubricator in order to give a sight indication as to the filled condition of the lubricator.

For replenishing the supply of lubricant to the lubricator 10, a reservoir 20 is provided containing a main supply of lubricant which is arranged to be forced out of the reservoir 20 by means of a piston 21 actuated by air pressure admitted through the pipe 22. A discharge pipe 23 leads from the discharge side of the piston 21 to the several lubricators 10 which are to be automatically filled.

For controlling the supply of lubricant from the main supply reservoir 20, the control mechanism 12 is interposed between the reservoir 20 and the lubricator 10 and in this instance consists of a fitting having an inlet 24 connected for communication with the reservoir discharge pipe 23 and an outlet 25 connected to communicate with the fitting 14 of the lubricator 10. This mechanism 12 is in the form of a valve fitting having a passage 26 transversely disposed with respect to the inlet 24 and outlet 25 and is arranged to receive a slidable valve body 27 for opening and closing communication between the inlet 24 and outlet 25. In order to balance the pressure or opposite sides of the body 27, the fitting 12 is provided with end ports 28 and 30 which divert the entering grease into two opposite paths, one entering the passage 26 at one side of the valve 27 and the other entering the passage 26 at the opposite side of the valve 27. Since these ports are always open to the inlet 24, the valve body is balanced and can be readily moved from one position to another. In order to shift the valve 27, it is provided with a stem 31 which extends through the end of the fitting 12 so that it is accessible from the outside of the fitting and the relative operating positions of the valve stem 31 and lubricator stem 18 is one of parallelism. The stuffing box 32 or equivalent means serve to prevent leakage of grease along the movable stem 31. The projecting end of this stem 31 is provided with a threaded portion 33 for mounting two threaded tappets 34 and 35 which are arranged to be engaged or picked up by a movable trip arm 36 which is fixedly attached to the lubricator stem 18 by means of a set screw 37. Thus, as the lubricator stem moves in one direction it will finally bring the arm 36 to the point where it will engage one of the tappets to transmit motion to the valve stem 31 and when moved in the opposite direction will finally reach a position where it will engage the other tappet and consequently move the stem 31 in the opposite direction. One of these directions of movement causes the valve 27 to uncover the outlet 25 so the lubricant under pressure is free to flow from the inlet 24 around the port 28 and thence through the outlet 25 to fill the reservoir of the lubricator. This filling action causes the lubricator stem 18 to move outwardly and thereby carry the trip arm 36 into engagement with the tappet 35 so that as this movement continues the valve 27 will be brought to a position again closing the passage 26. By changing the position of the tappets 34 and 35 relative to the trip arm 35, it will be evident that the operation of the valve 27 can be controlled at will so that it opens when the lubricator is one-half empty, one-fourth empty or at any predetermined time of replenishment.

Should it be desired to connect the lubricator 10 to receive a continuous feed supply from the control mechanism 12, the stem 31 is manually lifted to bring the valve 27 to open position uncovering the outlet 25 and is then fixed in such position by tightening the set screw 39 of the arm 36. This allows free flow of the grease under pressure into the chamber 13 and out by way of the outlet in the shank 15 to the bearing to be lubricated. Under these conditions a continuous flow of lubricant can be adjusted from quantities supplied by means of a needle valve 38 threaded into a passage 40 of the fitting which intercepts the outlet 25 so that by advancing the needle valve 38 into or across the outlet 25 the discharge area will be varied to meet the particular requirements.

Since the reservoir 20 is arranged to supply a number of bearings by feeding the lubricant through the pipe 23 to the respective control devices 12, and since conditions and each bearing are different, it will be obvious that each control fitting or each pipe adjacent thereto should be equipped with some control means whereby the flow of lubricant can be regulated. To take care of this condition, the present construction shows a manually operable plug valve 41 located in the supply pipe in close proximity to a control device 12 and by setting the through port 42 of this valve 41 the passage leading from the pipe 23 to the control device 12 can be nicely regulated and set to permit just the amount of lubricant to pass into the control device. Such a valve 41 will be located to regulate each branch pipe to a control device 12 and each is set according to the conditions at the particular bearing which is to be controlled by it. This construction avoids flooding or an excess of lubricant at one bearing and ensures all bearings being lubricated properly and with the proportioned amount of lubricant.

It will now be apparent that a complete unitary control device has been devised for pressure lubricating systems whereby automatically discharging grease cups or lubricators can be automatically replenished as they become emptied or approach the empty condition and hence there is always a certain and sure supply of grease to the bearing or bearings which are protected by the lubricators. Furthermore, the automatic system is capable of a relatively wide range of adjustment from a continuous replenishing operation to various predetermined intermittent feeding operations and in all of which the lubricators are effectively supplied with grease for continuing the automatic protection of the bearings.

Having thus described my invention, I claim:

1. A lubricator control system comprising a lubricator for supplying grease under pressure, pressure means for discharging said grease from said lubricator, an indicator associated with said means, a control unit having an outlet connected to said lubricator and an inlet connected to a source of lubricant under pressure, and means actuated by said indicator for automatically operating said control unit to establish or cut off communication between said inlet and said outlet whereby said lubricator is automatically replenished while continuing to discharge lubricant to said part.

2. A lubricator control system comprising a lubricator for supplying grease under pressure, pressure means for discharging said grease from said lubricator, a control unit having an outlet connected to said lubricator and an inlet connected to a source of lubricant under pressure, and means operable at a predetermined lubricant level in said lubricator for automatically causing said control unit to establish communication between said inlet and said outlet whereby said lubricator is automatically replenished while continuing to discharge lubricant to said part.

3. A lubricator control system comprising a lubricator attached to a part to be lubricated and arranged to automatically discharge lubricant therefrom under pressure, a source of lubricant under pressure having a discharge conduit to supply said lubricator, a valve in said conduit, and means operable at a predetermined lubricant level for opening said valve whereby said lubricator is automatically replenished while continuing to discharge lubricant to said part.

4. A lubricator control system comprising a lubricator attached to a part to be lubricated and arranged to automatically discharge lubricant therefrom under pressure, a source of lubricant under pressure having a discharge conduit to supply said lubricator, a valve in said conduit, and means operable at a predetermined lubricant level for closing said valve whereby feed to said lubricator is cut off while said lubricator continues to feed the part to be lubricated.

5. A lubricator control system comprising a lubricator attached to a part to be lubricated and arranged to automatically and continuously discharge lubricant therefrom, under pressure, a source of lubricant having a discharge conduit to supply said lubricator, a valve in said conduit, means operable at a predetermined lubricant level for opening said valve to replenish said lubricator, and means for varying the effective level of said lubricator.

6. A lubricator control system comprising a lubricator attached to a part to be lubricated and arranged to automatically and continuously discharge lubricant therefrom under pressure, a source of lubricant under pressure having a discharge conduit to supply said lubricator, a valve in said conduit, means operable at a predetermined lubricant level for closing said valve whereby feed to said lubricator is cut off, and a manually controlled device for rendering said closing means ineffective whereby a continuous feed of lubricant to said lubricator takes place.

7. A lubricator control system comprising a lubricator attached to a part to be lubricated and arranged to automatically and continuously discharge lubricant therefrom under pressure, a source of lubricant under pressure having a discharge conduit to supply said lubricator, a valve in said conduit, means operable at a predetermined lubricant level for closing said valve whereby feed to said lubricator is cut off, and a manually controlled device for rendering said closing means ineffective whereby a continuous feed of lubricant to said lubricator takes place and means for regulating said feed.

8. A lubricator control system comprising a grease lubricator having an outlet to a part to be lubricated, a pressure actuated plunger for continuously discharging grease from said lubricator, a main source of lubricant under pressure having a discharge conduit connected to said lubricator between said plunger and said outlet, a valve in said conduit, and operating means controlled by said plunger for opening said valve at a predetermined position of said plunger.

9. A lubricator control system comprising a grease lubricator having an outlet to a part to be lubricated, a pressure actuated plunger for discharging grease from said lubricator, a main source of lubricant under pressure having a discharge conduit connected to said lubricator between said plunger and said outlet, a valve in said conduit, operating means controlled by said plunger for opening said valve at a predetermined position of said plunger, and means whereby said valve is maintained open to continuously supply said lubricator with lubricant.

Signed at Philadelphia, county of Philadelphia, State of Pennsylvania, this 25th day of July, 1928.

JOHN FRANKLIN MacINDOE.